United States Patent
Li et al.

(10) Patent No.: US 9,680,743 B2
(45) Date of Patent: *Jun. 13, 2017

(54) MESSAGE FORWARDING METHOD, SYSTEM, AND RELAY AGENT DEVICE

(71) Applicant: Huawei Technologies Co., Ltd., Shenzhen (CN)

(72) Inventors: Chenggang Li, Shenzhen (CN); Hongyu Li, Shenzhen (CN); Yong Luo, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,105

(22) Filed: Mar. 30, 2016

(65) Prior Publication Data

US 2016/0212046 A1 Jul. 21, 2016

Related U.S. Application Data

(63) Continuation of application No. 14/444,554, filed on Jul. 28, 2014, now Pat. No. 9,331,939, which is a (Continued)

(30) Foreign Application Priority Data

Mar. 29, 2011 (CN) .......................... 2011 1 0077032

(51) Int. Cl.
*H04L 12/28* (2006.01)
*H04L 12/56* (2006.01)
(Continued)

(52) U.S. Cl.
CPC ............ *H04L 45/74* (2013.01); *H04L 45/741* (2013.01); *H04L 47/10* (2013.01);
(Continued)

(58) Field of Classification Search
CPC ............ H04L 61/2015; H04L 61/6059; H04L 45/741
See application file for complete search history.

(56) References Cited

U.S. PATENT DOCUMENTS 7,512,969 B2  3/2009  Gould et al.
8,086,713 B2  12/2011 Gandhewar et al.
(Continued)

FOREIGN PATENT DOCUMENTS

CN  1863199 A  11/2006
CN  1897589 A  1/2007
(Continued)

OTHER PUBLICATIONS

Partial English Translation and Abstract of Chinese Patent Application No. CN1863199, Nov. 15, 2006, 19 pages.
(Continued)

*Primary Examiner* — Derrick Ferris
*Assistant Examiner* — Farhad Ali
(74) *Attorney, Agent, or Firm* — Conley Rose, P.C.

(57) ABSTRACT

The present disclosure provides a message forwarding method and system, and a relay agent device. The forwarding method includes receiving a first dynamic host configuration protocol (DHCP) for Internet Protocol (IP) version 6 (DHCPv6) message from a DHCPv6 client through a layer-3 interface, generating a relay-forward message, where the first DHCPv6 message is encapsulated into the relay-forward message and an identifier (ID) of the layer-3 interface is added therein, and sending the relay-forward message to a DHCPv6 server.

8 Claims, 9 Drawing Sheets

Related U.S. Application Data continuation of application No. 14/136,481, filed on Dec. 20, 2013, which is a continuation of application No. PCT/CN2012/073259, filed on Mar. 29, 2012.

(51) Int. Cl.
  *H04L 12/741* (2013.01)
  *H04L 29/12* (2006.01)
  *H04L 12/749* (2013.01)
  *H04L 12/801* (2013.01)
  *H04L 29/08* (2006.01)

(52) U.S. Cl.
  CPC ...... *H04L 61/2015* (2013.01); *H04L 61/6059* (2013.01); *H04L 67/2842* (2013.01); *H04L 67/28* (2013.01); *H04L 2212/00* (2013.01)

(56) References Cited

U.S. PATENT DOCUMENTS

| | | |
|---|---|---|
| 8,285,875 B2 | 10/2012 | Gandhewar et al. |
| 8,437,360 B2 | 5/2013 | Singh et al. |
| 8,589,582 B2 | 11/2013 | Melsen et al. |
| 8,655,990 B2 | 2/2014 | Zhu et al. |
| 2005/0114880 A1 | 5/2005 | Gould et al. |
| 2008/0244090 A1 | 10/2008 | Zhu et al. |
| 2009/0125957 A1 | 5/2009 | Singh et al. |
| 2009/0129373 A1 | 5/2009 | Eguchi et al. |
| 2010/0313265 A1 | 12/2010 | Lin et al. |

FOREIGN PATENT DOCUMENTS

| | | |
|---|---|---|
| CN | 101047614 A | 10/2007 |
| CN | 101516048 A | 8/2009 |

OTHER PUBLICATIONS

"TR-177, IPv6 in the context of TR-101," Broadband Forum, Technical Report, Issue 1, Nov. 2010, 49 pages.

Droms, R., Ed., et al., "Dynamic Host Configuration Protocol for IPv6 (DHCPv6)," RFC 3315, Jul. 2003, 90 pages.

Hinden, R., et al., "IP Version 6 Addressing Architecture," RFC 2373, Jul. 1998, 28 pages.

Foreign Communication From a Counterpart Application, Chinese Application No. 201110077032.8, Chinese Office Action dated May 22, 2014, 8 pages.

Foreign Communication From a Counterpart Application, European Application No. 12763865.8, Extended European Search Report dated Dec. 10, 2013, 7 pages.

Foreign Communication From a Counterpart Application, PCT Application No. PCT/CN2012/073259, English Translation of International Search Report dated Jun. 28, 2012, 2 pages.

Foreign Communication From a Counterpart Application, PCT Application No. PCT/CN2012/073259, English Translation of Written Opinion dated Jun. 28, 2012, 12 pages.

MESSAGE FORWARDING METHOD, SYSTEM, AND RELAY AGENT DEVICE

CROSS-REFERENCE TO RELATED APPLICATIONS

This application is a continuation of U.S. patent application Ser. No. 14/444,554, filed on Jul. 28, 2014, which is a continuation of U.S. patent application Ser. No. 14/136,481, filed on Dec. 20, 2013, which is a continuation of International Application No. PCT/CN2012/073259, filed on Mar. 29, 2012. The International Application claims priority to Chinese Patent Application No. 201110077032.8, filed on Mar. 29, 2011. The afore-mentioned patent applications are hereby incorporated by reference in their entireties.

TECHNICAL FIELD

Embodiments of the present disclosure relate to network communications technologies, and in particular to a message forwarding method and system, and a relay agent device.

BACKGROUND

A dynamic host configuration protocol (DHCP) for Internet Protocol version 6 (IPv6) (DHCPv6) network system includes a DHCPv6 client, a DHCPv6 server, and a DHCPv6 relay agent, where the DHCPv6 relay agent may further be classified into two large categories: DHCPv6 layer-3 relay agent and DHCPv6 layer-2 relay agent. In the network, the DHCPv6 layer-3 relay agent is located between the DHCPv6 client and the DHCPv6 server, and relays and forwards messages between the DHCPv6 client and the DHCPv6 server.

According to a request for comments (RFC) 3315, the DHCPv6 layer-3 relay agent reconstructs a relay-forward message when performing layer-3 relay processing for an upstream DHCPv6 message, and encapsulates the original upstream DHCPv6 message into the relay-forward message for forwarding to the DHCPv6 server. After receiving the relay-forward message forwarded by the DHCPv6 layer-3 relay agent, the DHCPv6 server constructs a relay-reply message and encapsulates the message sent to the DHCPv6 client into the relay-reply message layer by layer, and sends the encapsulated message to the DHCPv6 layer-3 relay agent. The DHCPv6 layer-3 relay agent extracts a new downstream DHCPv6 message from the relay-reply message when performing layer-3 relay processing for the relay-reply message, and forwards the DHCPv6 message to a lower-level device according to a peer address field, a link address field, and an interface identifier option (interface-ID option) field in the relay-reply message. The peer-address is an IPv6 address of the lower-level device connected to the DHCPv6 layer-3 relay agent, the link-address is an IPv6 address of a layer-3 interface for connecting the DHCPv6 layer-3 relay agent to the lower-level device, and the interface-ID option is an ID of a user port for connecting the DHCPv6 layer-3 relay agent to the lower-level device. As provided by the protocol, only a global unicast address or a site-local address can be filled in the link-address filed. If the layer-3 interface is not configured with any global unicast address or site-local address, only an unspecified address (::) can be filled in the link-address, and the interface-ID option is used to carry ID information of the user port.

When the lower-level device uses a link-local address and the layer-3 interface for connecting the DHCPv6 layer-3 relay agent to the lower-level device also uses a link-local address, in the relay-reply message, the peer-address is a link-local address and the link-address is an unspecified address. In this case, the DHCPv6 layer-3 relay agent needs to send the downstream DHCPv6 message to the lower-level device according to the user port identified by the interface-ID option. The user port is a physical port on the layer-3 relay agent device, and a manner of using the physical port is configuring it as a layer-3 interface and receiving and sending a layer-3 message using a configured IPv6 address. However, the user port of the DHCPv6 layer-3 relay agent generally does not correspond to the layer-3 interface on a one-to-one basis. For example, in a triple-play scenario, multiple service streams need to be configured on a user port of the DHCPv6 layer-3 relay agent. The service streams are used to separately bear different services of a same user, and a virtual local area network (VLAN) bears a same service on different user ports. Each VLAN is configured with a layer-3 interface, that is, the user port and the VLAN or the layer-3 interface are in a many-to-many relationship. In this case, the DHCPv6 layer-3 relay agent can find only a unique user port according to the interface-ID option, but cannot find a unique layer-3 interface, and therefore cannot send the downstream DHCPv6 message to the lower-level device through a correct layer-3 interface.

To forward the DHCPv6 message to the lower-level device correctly, there exists the following solutions in the prior art. One solution is configuring a global unicast address or a site-local address for the lower-level device according to RFC 3315 such that the DHCPv6 layer-3 relay agent may query a routing table using the peer-address to find the layer-3 interface, and send the downstream DHCPv6 message to the lower-level device through a correct layer-3 interface. Another solution is configuring, according to RFC 3315, a global unicast address or a site-local address for the layer-3 interface for connecting the DHCPv6 layer-3 relay agent to the lower-level device such that the DHCPv6 layer-3 relay agent may use the link-address to find the layer-3 interface, and send the downstream DHCPv6 message to the lower-level device through a correct layer-3 interface. Still another solution is configuring a layer-3 interface for each user port of the DHCPv6 layer-3 relay agent according to RFC 3315 to make the user port correspond to the layer-3 interface on a one-to-one basis such that the layer-3 relay agent may first use the interface-ID option to find a unique user port, and then find a unique corresponding layer-3 interface according to the user port, and send the downstream DHCPv6 message to the lower-level device through a correct layer-3 interface.

In a process of implementing the present disclosure, the inventor finds that the prior art has at least the following problems. No matter a global unicast address or a site-local address is configured for the lower-level device, or for the layer-3 interface of the DHCPv6 layer-3 relay agent, the planning and configuration workload of the global unicast address or a site-local address is increased, and resources of global unicast addresses or site-local addresses are wasted. The solution of configuring a layer-3 interface for each user port increases the number of layer-3 interfaces on the DHCPv6 layer-3 relay agent, which greatly increases the workload of layer-3 forwarding of the DHCPv6 layer-3 relay agent, reduces layer-3 forwarding performance, and wastes IPv6 address resources.

SUMMARY

Embodiments of the present disclosure provide a message forwarding method and system, and a relay agent device, which are used to overcome disadvantages of the prior art, forward messages between a client and a server through a correct layer-3 interface, and improve a success ratio of message forwarding.

An embodiment of the present disclosure provides a message forwarding method implemented by a relay agent device. The method includes receiving a first DHCPv6 message from a DHCPv6 client through a layer-3 interface, generating a relay-forward message, where the first DHCPv6 message is encapsulated into the relay-forward message and an ID of the layer-3 interface is added therein, and sending the relay-forward message to a DHCPv6 server.

The present disclosure provides a relay agent device that includes a hardware processor and a non-transitory storage medium accessible to the hardware processor. The non-transitory storage medium comprising the following modules implemented by the hardware processor a first receiving module configured to receive a first DHCPv6 message from a DHCPv6 client, a message generating module configured to generate a relay-forward message, where the first DHCPv6 message is encapsulated into the relay-forward message and an ID of a layer-3 interface receiving the first DHCPv6 message is added therein, and a first forwarding module configured to send the relay-forward message to a DHCPv6 server.

An embodiment of the present disclosure provides a message forwarding system including a relay agent device and a DHCPv6 server. The relay agent device is configured to construct a relay-forward message after receiving a first DHCPv6 message from a DHCPv6 client, where the first DHCPv6 message is encapsulated into the relay-forward message and an ID of a layer-3 interface receiving the first DHCPv6 message is added therein, and send the relay-forward message to the DHCPv6 server. The DHCPv6 server is configured to receive the relay-forward message sent by the relay agent device, and generate, according to the relay-forward message, a relay-reply message including the ID of the layer-3 interface.

According to the message forwarding method and system, and the relay agent device provided by the embodiments of the present disclosure, a relay-forward message carries an ID of a layer-3 interface on which a relay agent device receives a message sent by a DHCPv6 client to a DHCPv6 server such that the server generates, according to the relay-forward message, a relay-reply message including the ID of the layer-3 interface. Therefore, the relay agent device can send the message of the DHCPv6 server to the DHCPv6 client through a correct layer-3 interface, which improves a success ratio of message forwarding between the DHCPv6 client and the DHCPv6 server, and in addition, compared with the prior art, the embodiments of the present disclosure may further save resources of global unicast addresses or site-local addresses, reduce the forwarding workload of the relay agent device, and improve layer-3 forwarding performance.

BRIEF DESCRIPTION OF DRAWINGS

To illustrate the solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, solutions, and advantages of the embodiments of the present disclosure more comprehensible, the following clearly and completely describes the solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
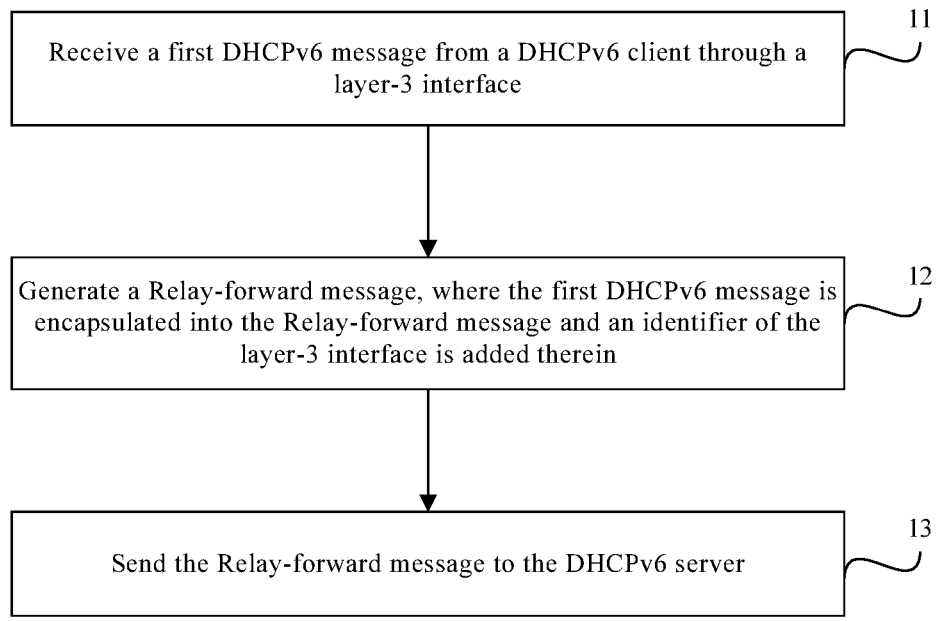
FIG. 1 is a flowchart of a message forwarding method according to Embodiment 1 of the present disclosure.

FIG. 1 is a flowchart of a message forwarding method according to Embodiment 1 of the present disclosure. As shown in FIG. 1, the method of this embodiment includes the following steps.

Step 11: Receive a first DHCPv6 message from a DHCPv6 client through a layer-3 interface.

Step 12: Generate a relay-forward message, where the first DHCPv6 message is encapsulated into the relay-forward message and an ID of the layer-3 interface is added therein.

For example, a DHCPv6 layer-3 relay agent receives, through its layer-3 interface, a DHCPv6 message sent by a DHCPv6 client (referred to as a client below) to a DHCPv6 server (referred to as a server below), that is, a first DHCPv6 message. The DHCPv6 layer-3 relay agent reconstructs a relay-forward message when performing layer-3 relay processing for the first DHCPv6. The relay-forward message includes a relay message option (relay-message option (option 9)) field. The DHCPv6 layer-3 relay agent encapsulates the first DHCPv6 message into the relay-message option field, and then fills information in the peer-address field, the link-address field, and the interface-ID option (that is, option 18) field in the relay-forward message.

In this embodiment, the IPv6 address of a lower-level device connected to the DHCPv6 layer-3 relay agent is filled in the peer-address field. The IPv6 address of the layer-3 interface (that is, the layer-3 interface on which the DHCPv6 layer-3 relay agent receives the first DHCPv6 message) for connecting the DHCPv6 layer-3 relay agent to the lower-level device is filled in the link-address field, and if the IPv6 address of the layer-3 interface is a link-local address, an unspecified address is filled in the field, and the interface-ID option field is an ID of a user port for connecting the DHCPv6 layer-3 relay agent to the lower-level device. In this embodiment, the lower-level device refers to a lower-level DHCPv6 device directly connected to the DHCPv6 layer-3 relay agent through the layer-3 interface, and may be a DHCPv6 client or may further be a next-level DHCPv6 layer-3 relay agent. If the lower-level device is a client, the DHCPv6 layer-3 relay agent directly receives, through its layer-3 interface, the first DHCPv6 message sent by the client, and if the lower-level device is a next-level DHCPv6 layer-3 relay agent, the DHCPv6 layer-3 relay agent receives, through its layer-3 interface, the first DHCPv6 message of the client forwarded by the next-level DHCPv6 layer-3 relay agent.

In this embodiment, the DHCPv6 layer-3 relay agent adds the ID of the layer-3 interface receiving the first DHCPv6 message to the relay-forward message when encapsulating the first DHCPv6 message into the relay-forward message, where the ID is used to uniquely identify the layer-3 interface receiving the first DHCPv6 message or forwarding the DHCPv6 message to the client. The ID of the layer-3 interface may be a VLAN ID corresponding to the layer-3 interface or an IP address of the layer-3 interface (the IP address is generally a link-local IP address), and may further be other information that can uniquely identify the layer-3 interface.

Step 13: Send the relay-forward message to the DHCPv6 server.

For example, the DHCPv6 layer-3 relay agent sends the relay-forward message to the server, and the server receives the relay-forward message, parses the message to acquire the first DHCPv6 message, and performs subsequent processing according to the first DHCPv6 message.

According to the message forwarding method of this embodiment, a DHCPv6 layer-3 relay agent adds an ID of a layer-3 interface receiving a first DHCPv6 message to a relay-forward message for sending to a server, and the server may generate, according to the relay-forward message, a relay-reply message including the ID of the layer-3 interface, and send the relay-reply message to the DHCPv6 layer-3 relay agent. In a scenario where a lower-level device uses a link-local address, the layer-3 interface connecting the lower-level device also uses a link-local address, and a user port and the layer-3 interface are in a many-to-many mapping, the DHCPv6 layer-3 relay agent may find the layer-3 interface according to the ID of the layer-3 interface in the relay-reply message using the method of this embodiment, and forward the message sent by the server to a client, to the client through a correct layer-3 interface. Compared with the prior art, the method of this embodiment may save resources of global unicast addresses or site-local addresses, and in addition, no one-to-one mapping is required for the user port and the layer-3 interface, which reduces the number of layer-3 interfaces and ensures layer-3 forwarding performance of the DHCPv6 layer-3 relay agent.

Figure 2:
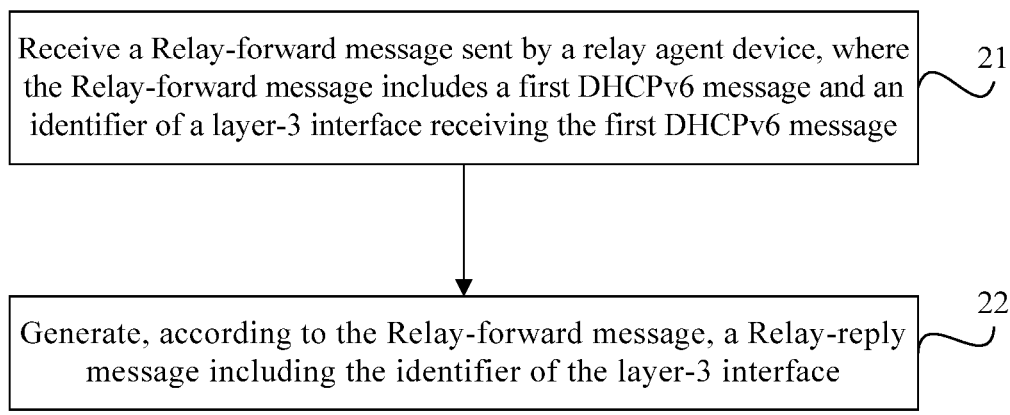
FIG. 2 is a flowchart of a message generating method according to Embodiment 2 of the present disclosure.

FIG. 2 is a flowchart of a message generating method according to Embodiment 2 of the present disclosure. As shown in FIG. 2, the method of this embodiment includes the following steps.

Step 21: Receive a relay-forward message sent by a relay agent device, where the relay-forward message includes a first DHCPv6 message sent by a client to a server and an ID of a layer-3 interface on which the relay agent device receives the first DHCPv6 message.

The relay agent device mainly refers to a DHCPv6 layer-3 relay agent. For example, the server receives the relay-forward message sent by the DHCPv6 layer-3 relay agent, where the relay-forward message includes the first DHCPv6 message sent by the client to the server, and the ID of the layer-3 interface on which the DHCPv6 layer-3 relay agent receives the first DHCPv6 message. The layer-3 interface is further a forwarding interface on which the DHCPv6 layer-3 relay agent forwards the second DHCPv6 message sent by the server to the client, to the client.

Step 22: Generate, according to the relay-forward message, a relay-reply message including the ID of the layer-3 interface.

For example, the server constructs a response relay-reply message after receiving the relay-forward message sent by the DHCPv6 layer-3 relay agent. The relay-reply message also includes a relay-message option (option 9) field. The server encapsulates, according to the encapsulation layers of the received relay-forward message, the second DHCPv6 message sent to the client into the relay-message option field layer by layer. If the relay-forward message received by the server is relayed by multiple DHCPv6 layer-3 relay agents, and includes multiple layers of encapsulation of the relay-message option field, the relay-reply message must correspondingly include multiple layers of encapsulation of the relay-message option field. Then the server separately copies the peer-address field, the link-address field, and the interface-ID option field at each layer in the relay-forward message to the response relay-reply message.

In this embodiment, the server needs to copy the ID of the layer-3 interface ID in the relay-forward message to the relay-reply message.

Afterward, the server sends the relay-reply message to the DHCPv6 layer-3 relay agent, and the DHCPv6 layer-3 relay agent forwards, through its layer-3 interface, the second DHCPv6 message encapsulated into the relay-reply message to the client.

According to the message generating method of this embodiment, a server generates, according to a received relay-forward message, a relay-reply message including an ID of a layer-3 interface. When a DHCPv6 layer-3 relay agent receives the relay-reply message, if the DHCPv6 layer-3 relay agent cannot forward a second DHCPv6 message to a client according to information in a peer-address field, a link-address field, or an interface-ID option field in the relay-reply message, the DHCPv6 layer-3 relay agent may find a correct layer-3 interface according to the ID of the layer-3 interface, thereby forwarding the second DHCPv6 message to the client through the correct layer-3 interface (the forwarding process may be implemented by a lower-level device). Compared with the prior art, the method of this embodiment is used to generate a relay-reply message including an ID of a layer-3 interface, and it is unnecessary to configure global unicast addresses or site-local addresses of a lower-level device or a layer-3 interface, which saves resources of global unicast addresses or site-local addresses. In addition, no one-to-one mapping is required for the user port and the layer-3 interface, which reduces the number of layer-3 interfaces and workload of the DHCPv6 layer-3 relay agent, and improves the forwarding performance of the DHCPv6 layer-3 relay agent, and the reduction of the layer-3 interfaces further helps to save IP address resources.

Figure 3:
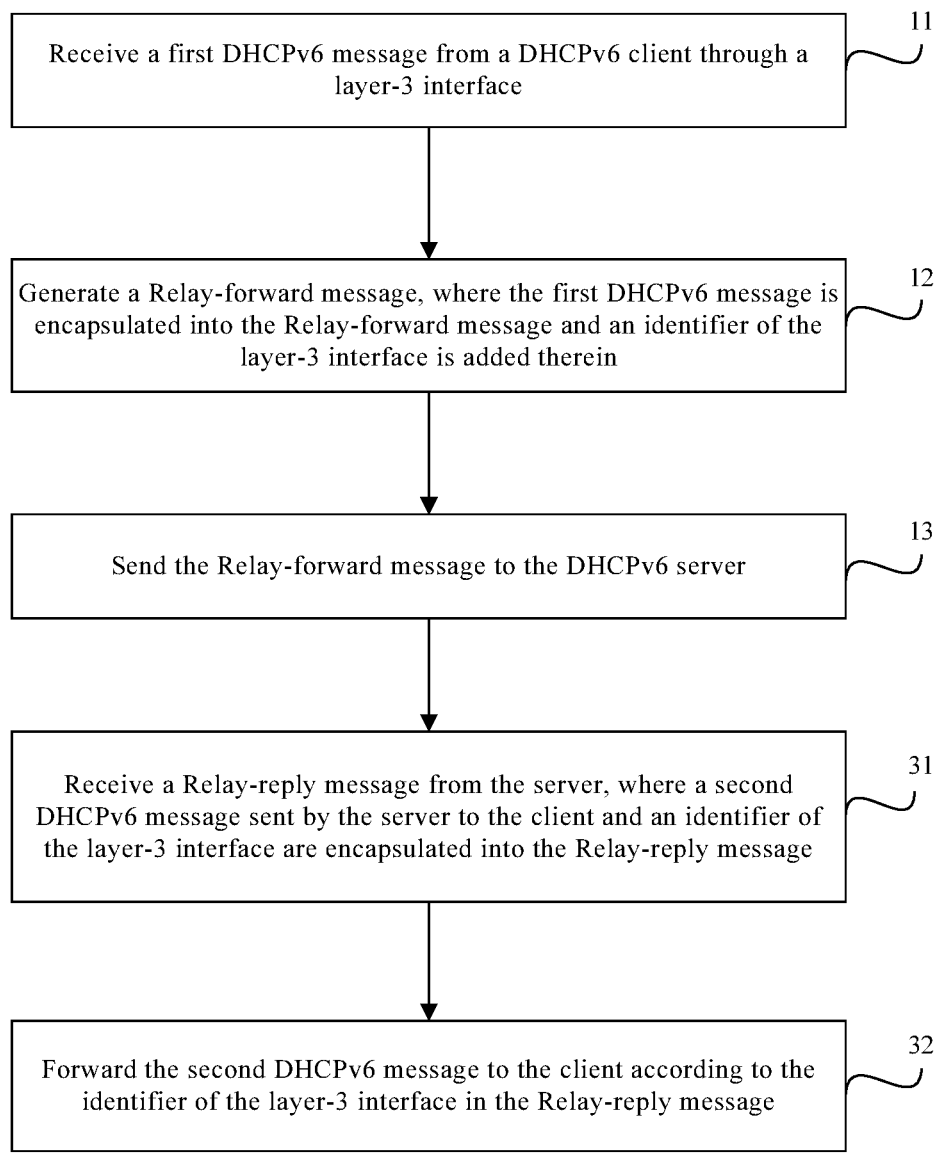
FIG. 3 is a flowchart of a message forwarding method according to Embodiment 3 of the present disclosure.

FIG. 3 is a flowchart of a message forwarding method according to Embodiment 3 of the present disclosure. This embodiment is implemented based on Embodiment 1, and as shown in FIG. 3, after step 13, the method of this embodiment includes the following steps.

Step 31: Receive a relay-reply message from the server, where a second DHCPv6 message sent by the server to the client and an ID of the layer-3 interface are encapsulated into the relay-reply message.

The second DHCPv6 message is a downstream DHCPv6 message sent by the server to the client. For the process of generating a relay-reply message by the server according to the relay-forward message, reference may be made to the embodiment shown in FIG. 2. The ID of the layer-3 interface in the relay-reply message is the ID of the layer-3 interface in the corresponding relay-forward message, and is used to identify a layer-3 interface on which the DHCPv6 layer-3 relay agent forwards the second DHCPv6 message.

Step 32: Forward the second DHCPv6 message to the client according to the ID of the layer-3 interface in the relay-reply message.

For example, the DHCPv6 layer-3 relay agent extracts the second DHCPv6 message from the relay-message option field of the relay-reply message when performing layer-3 relay processing for the relay-reply message, and forwards the second DHCPv6 message to the lower-level device through the layer-3 interface.

Generally, the DHCPv6 layer-3 relay agent forwards the second DHCPv6 message according to the peer-address field, the link-address field, or the interface-ID option field in the relay-reply message. For example, if the lower-level device uses a global unicast address or a site-local address, the DHCPv6 layer-3 relay agent may directly query a routing table according to the peer-address field to find a layer-3 interface, and forward the second DHCPv6 message to the lower-level device through the layer-3 interface, where the second DHCPv6 message is finally forwarded to the client. For another example, if the lower-level device uses a link-local address, but the layer-3 interface uses a global unicast address or a site-local address, the DHCPv6 layer-3 relay agent may directly find a layer-3 interface according to the link-address field, and forward the second DHCPv6 message to the lower-level device through the layer-3 interface, where the second DHCPv6 message is finally forwarded to the client. For another example, if both the lower-level device and the layer-3 interface use link-local addresses, the DHCPv6 layer-3 relay agent may further find a unique user port according to the interface-ID option field, find a unique layer-3 interface according to a one-to-one mapping between the user port and the layer-3 interface, and forward the second DHCPv6 message to the lower-level device through the layer-3 interface, where the second DHCPv6 message is finally forwarded to the client. However, if the user port and the layer-3 interface are not in a one-to-one mapping in this case, the DHCPv6 layer-3 relay agent cannot find a correct layer-3 interface according to the interface-ID option field.

In a scenario where both the lower-level device and the layer-3 interface use link-local addresses, and there is a many-to-many mapping between the user port and the layer-3 interface, the DHCPv6 layer-3 relay agent of this embodiment may find a correct layer-3 interface according to the ID of the layer-3 interface in the relay-reply message, and forward the second DHCPv6 message to the lower-level device, where the second DHCPv6 message is finally forwarded to the client. The ID of the layer-3 interface may uniquely identify a layer-3 interface on the DHCPv6 layer-3 relay agent, for example, a VLAN ID of the VLAN where the layer-3 interface is located, or an IP address of the layer-3 interface, and so on. No matter the user port of the DHCPv6 layer-3 relay agent and the layer-3 interface are in a one-to-one mapping or a many-to-many mapping, there is a mapping between the ID of the user port and the ID of the layer-3 interface which are encapsulated into the relay-forward message and the relay-reply message, and if the user port and the layer-3 interface have a many-to-many mapping, the ID of the layer-3 interface in the relay-forward message and the relay-reply message is an ID of one layer-3 interface in the multiple layer-3 interfaces corresponding to the user port.

In addition, in other scenarios, the DHCPv6 layer-3 relay agent of this embodiment may further find a correct layer-3 interface directly according to the ID of the layer-3 interface in the relay-reply message, and forward the second DHCPv6 message to the lower-level device, where the second DHCPv6 message is finally forwarded to the client.

In the above forwarding process, if the lower-level device is a client, the second DHCPv6 message is directly sent by the DHCPv6 layer-3 relay agent to the client through the layer-3 interface of the DHCPv6 layer-3 relay agent.

According to the message forwarding method of this embodiment, a DHCPv6 layer-3 relay agent can find a correct layer-3 interface according to an ID of a layer-3 interface in a relay-reply message in any scenario, and forward a second DHCPv6 message to a lower-level device through the layer-3 interface to finally forward the second DHCPv6 message to the client such that both the lower-level device and the layer-3 interface do not need to be configured with a global unicast address or a site-local address, and do not require a one-to-one mapping between the layer-3 interface and a user port. Therefore, not only resources of global unicast addresses or site-local addresses are saved, but also the number of layer-3 interfaces of the DHCPv6 layer-3 relay agent is reduced, and forwarding performance of the DHCPv6 layer-3 relay agent is improved.

Figure 4A:
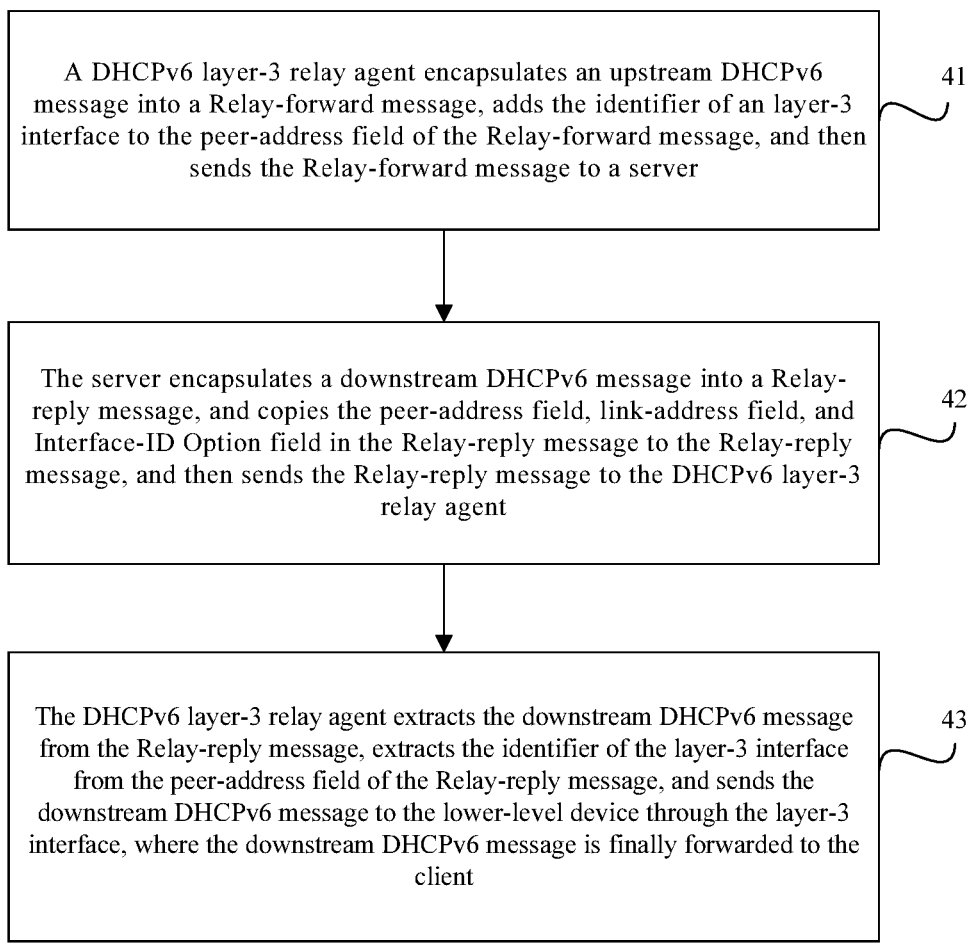
FIG. 4A is a flowchart of a message processing method according to Embodiment 4 of the present disclosure.

FIG. 4A is a flowchart of a message processing method according to Embodiment 4 of the present disclosure. This embodiment may be implemented based on Embodiment 1 to Embodiment 3. As shown in FIG. 4, the method of this embodiment includes the following steps.

Step 41: A DHCPv6 layer-3 relay agent encapsulates an upstream DHCPv6 message into the relay-message option field of a relay-forward message, fills in the peer-address field, the link-address field, and the interface-ID option field, adds the ID of an layer-3 interface to the peer-address field of the relay-forward message, and then sends the relay-forward message to a server.

The upstream DHCPv6 message is a DHCPv6 message sent by a client to the server, that is, the first DHCPv6 message in Embodiment 1. As described above, the peer-address field is used to carry an IPv6 address of a lower-level device. If the lower-level device uses a link-local address, a link-local address is filled in the peer-address field. According to RFC 2373, the prefix of the link-local address is 64-bit FE80::/10. The method for automatically generating a link-local address is first generating an 64-bit extended unique ID (EUI-64) IDas an ID of the interface according to the link-layer address of the interface for connecting the lower-level device to the DHCPv6 layer-3 relay agent, and then combining the 64-bit prefix FE80:: with the 64-bit ID to form a 128-bit link-local address whose format is shown in FIG. 4B.

Figure 4B:
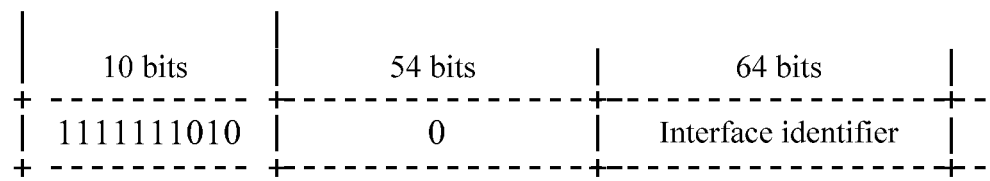
FIG. 4B is a schematic structural diagram of an existing link-local address according to Embodiment 4 of the present disclosure.

As known from FIG. 4B, the $10^{th}$ bit to $63^{rd}$ bit (that is, bit 10 to bit 63) of the automatically generated link local address are fixed to 0, and are also not the prefix of the link-local address, and belong to spare bits. Therefore, in this embodiment, the DHCPv6 layer-3 relay agent further inserts the ID of the layer-3 interface between bit 10 and bit 63 of the peer-address field. For example, in the case that the VLAN is configured with a layer-3 interface, the VLAN ID or the IP address and so on of the VLAN interface (that is, the layer-3 interface) may be inserted between bit 10 and bit 63.

Step 42: The server receives the relay-forward message, encapsulates a downstream DHCPv6 message into the relay-message option field of a relay-reply message, and copies the peer-address field, the link-address field, and the interface-ID option field in the relay-forward message to the response relay-reply message, and then sends the relay-reply message to the DHCPv6 layer-3 relay agent.

The downstream DHCPv6 message is a response message, that is, the second DHCPv6 message in Embodiment 2, which is sent by the server to the client according to the upstream DHCPv6 message. The ID of the layer-3 interface is inserted between bit 10 and bit 63 in the peer-address field of the relay-reply message.

Step 43: The DHCPv6 layer-3 relay agent receives the relay-reply message, extracts the downstream DHCPv6 message from the relay-reply message, extracts the ID of the layer-3 interface for connecting the DHCPv6 layer-3 relay agent to the lower-level device, from the peer-address field of the relay-reply message, locates the layer-3 interface according to the ID of the layer-3 interface, and sends the downstream DHCPv6 message to the lower-level device through the layer-3 interface, where the downstream DHCPv6 message is finally forwarded to the client.

According to the message processing method of this embodiment, an ID of a layer-3 interface connected to a lower-level device is inserted in spare bits of a peer-address field such that a DHCPv6 layer-3 relay agent may correctly locate a layer-3 interface forwarding a downstream DHCPv6 message, thereby correctly forwarding the downstream DHCPv6 message. Compared with the prior art, the message processing method of this embodiment has advantages of saving global unicast addresses or site-local addresses and reducing the number of layer-3 interfaces, and can improve the layer-3 forwarding efficiency of the DHCPv6 layer-3 relay agent.

In addition, because the interface-ID option field is a variable-length field, the ID of the layer-3 interface may further be carried by the interface-ID option field. The following embodiments of the present disclosure provide several implementations in which the interface-ID option field carries the ID of the layer-3 interface ID.

Figure 5:
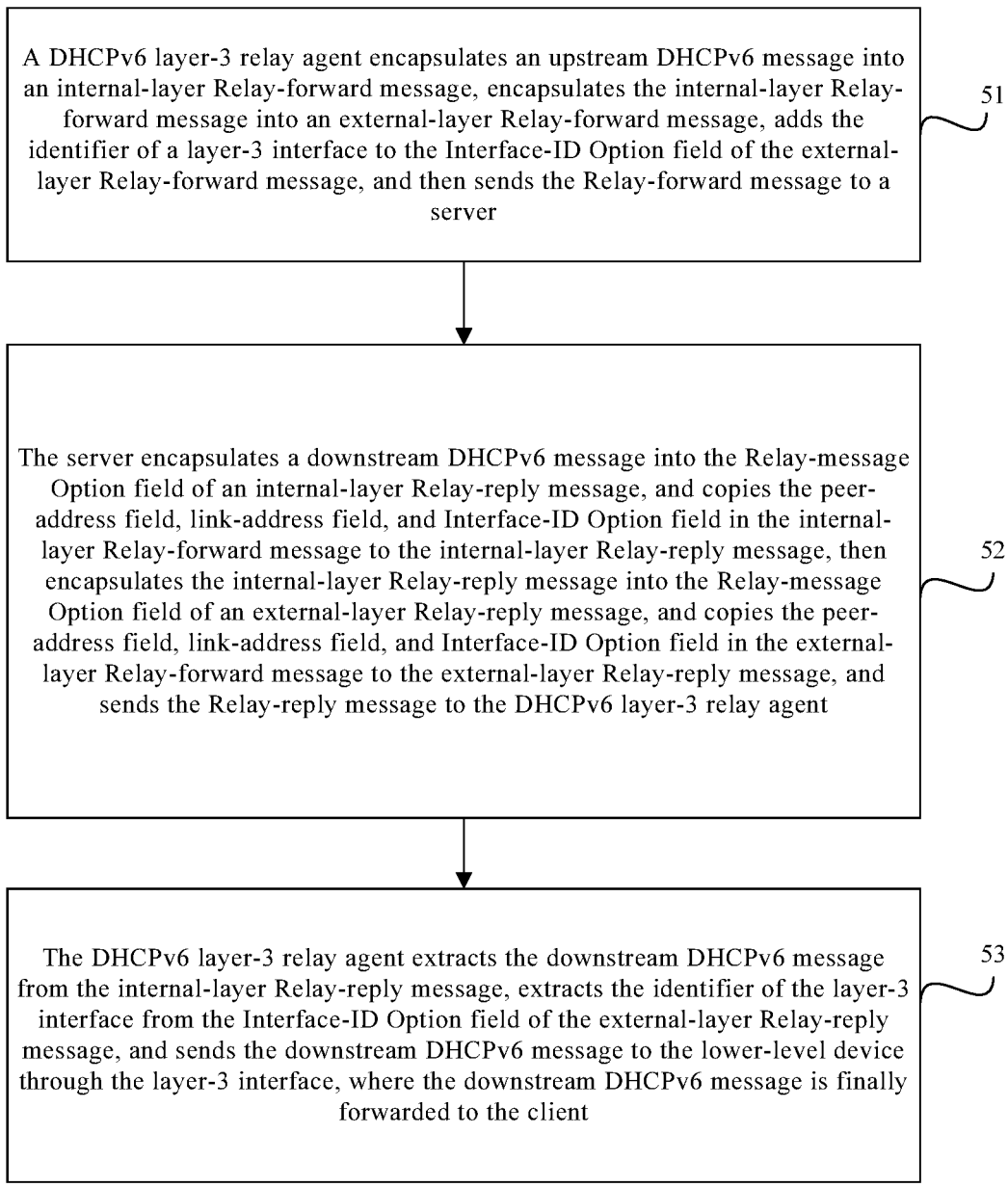
FIG. 5 is a flowchart of a message processing method according to Embodiment 5 of the present disclosure.

FIG. 5 is a flowchart of a message processing method according to Embodiment 5 of the present disclosure. This embodiment may be implemented based on Embodiment 1 to Embodiment 3. As shown in FIG. 5, the method of this embodiment includes the following steps.

Step 51: A DHCPv6 layer-3 relay agent encapsulates an upstream DHCPv6 message into the relay-message option field of an internal-layer relay-forward message, fills in the peer-address field, the link-address field, and the interface-ID option field of the internal-layer relay-forward message, encapsulates the internal-layer relay-forward message as a new message into the relay-message option field of an external-layer relay-forward message, and fills in the peer-address field, the link-address field, and the interface-ID option field of the external-layer relay-forward message, and then sends the relay-forward message to a server. The same content is filled in the peer-address field and the link-address field of the external-layer relay-forward message and the internal-layer relay-forward message. One of the two interface-ID option fields is used to add an ID of a user port specified by the protocol, and the other is used to add an ID of a layer-3 interface.

In this embodiment, the DHCPv6 layer-3 relay agent performs double encapsulation for the upstream DHCPv6 message, and provides two interface-ID option fields, where one of the interface-ID option fields is used to carry the ID of the layer-3 interface. This embodiment uses an example in which the interface-ID option field of the external-layer relay-forward message carries the ID of the layer-3 interface.

If the interface-ID option field of the internal-layer relay-forward message carries the ID of the layer-3 interface, after the ID of the layer-3 interface is added to the interface-ID option field of the internal-layer relay-forward message, the internal-layer relay-forward message is encapsulated into the relay-message option field of the external-layer relay-forward message.

Step 52: The server receives the relay-forward message, encapsulates a downstream DHCPv6 message into the relay-message option field of an internal-layer relay-reply message, and copies the peer-address field, the link-address field, and the interface-ID option field in the internal-layer relay-forward message to the response internal-layer relay-reply message, then encapsulates the internal-layer relay-reply message as a new message into the relay-message option field of an external-layer relay-reply message, and copies the peer-address field, the link-address field, and the interface-ID option field in the external-layer relay-forward message to the response external-layer relay-reply message, and sends the relay-reply message to the DHCPv6 layer-3 relay agent.

The server separately constructs an internal-layer relay-reply message and an external-layer relay-reply message according to the form of the received relay-forward message (including an internal-layer relay-forward message and an external-layer relay-forward), and carries the ID of the layer-3 interface in the generated relay-reply message by separately copying the peer-address field, the link-address field, and the interface-ID option field of the internal-layer relay-forward message and the external-layer relay-forward message.

Step 53: The DHCPv6 layer-3 relay agent extracts the internal-layer relay-reply message from the relay-message option field of the external-layer relay-reply message, extracts the downstream DHCPv6 message from the relay-message option field of the internal-layer relay-reply message, extracts the ID of the layer-3 interface for connecting the DHCPv6 layer-3 relay agent to a lower-level device, from the interface-ID option field of the external-layer relay-reply message, and sends the downstream DHCPv6 message to the lower-level device through the layer-3 interface located by the ID of the layer-3 interface, where the downstream DHCPv6 message is finally forwarded to the client.

When the ID of the layer-3 interface is encapsulated into the internal-layer relay-reply message, the DHCPv6 layer-3 relay agent extracts the downstream DHCPv6 message from the relay-message option field of the internal-layer relay-reply message, and extracts the ID of the layer-3 interface for connecting the DHCPv6 layer-3 relay agent to the lower-level device, from the interface-ID option field of the internal-layer relay-reply message.

According to the message processing method of this embodiment, a DHCPv6 layer-3 relay agent performs double encapsulation for an upstream DHCPv6 message, and provides two interface-ID option fields, where one of the interface-ID option fields is used to carry an ID of a layer-3 interface, thereby solving the problems in the prior art.

Figure 6A:
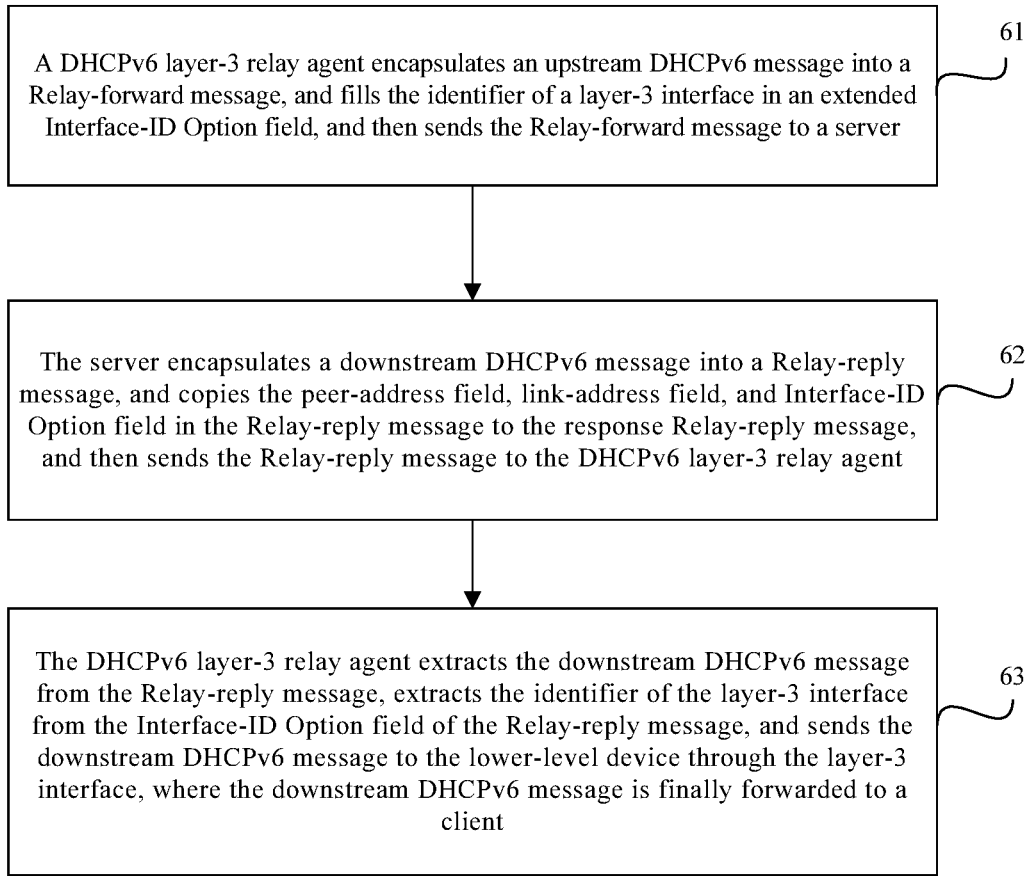
FIG. 6A is a flowchart of a message processing method according to Embodiment 6 of the present disclosure.

FIG. 6A is a flowchart of a message processing method according to Embodiment 6 of the present disclosure. This embodiment may be implemented based on Embodiment 1 to Embodiment 3. As shown in FIG. 6A, the method of this embodiment includes the following steps.

Step 61: A DHCPv6 layer-3 relay agent extends the interface-ID option field of a relay-forward message, encapsulates an upstream DHCPv6 message into the relay-message option field of the relay-forward message, and fills in the peer-address field, the link-address field, and the extended interface-ID option field of the relay-forward message (adds the ID of a layer-3 interface to the extended interface-ID option field while filling in the interface-ID option field), and then sends the relay-forward message to a server. The ID of a user port specified by the protocol and the ID of the layer-3 interface for connecting the DHCPv6 layer-3 relay agent to a lower-level device are filled in the extended interface-ID option field.

Figure 6B:
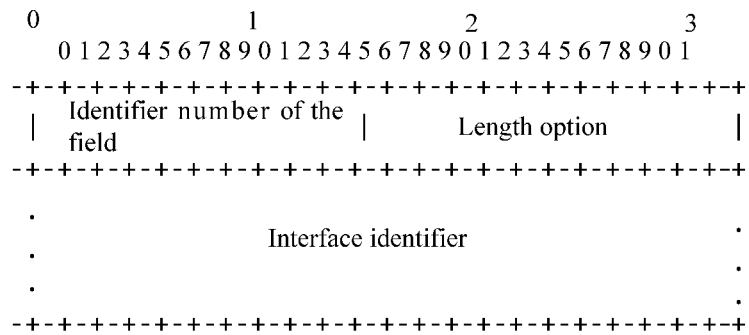
FIG. 6B is a schematic diagram of an existing structure of an interface-ID option field according to Embodiment 6 of the present disclosure.

According to RFC 3315, the interface-ID option field is used to carry the ID of the user port for connecting the DHCPv6 layer-3 relay agent to the lower-level device. The format of the field is shown in FIG. 6B, and includes an ID of the field (OPTION INTERFACE ID), a length option (option-len), and an interface ID field. The interface-ID field is used to carry the ID of the user port.

Figure 6C:
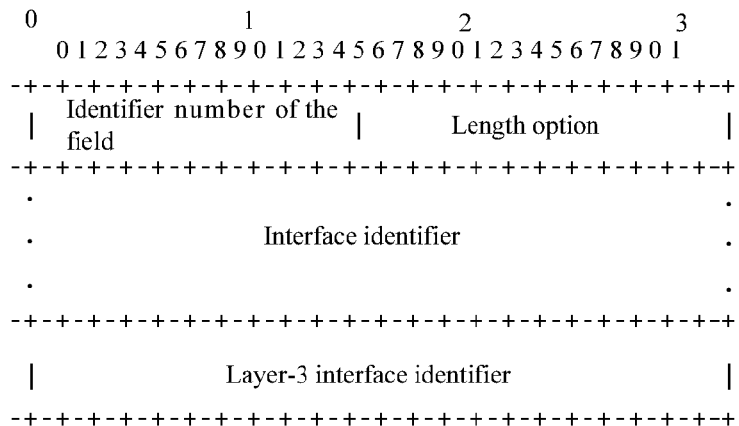
FIG. 6C is a schematic structural diagram of an interface-ID option field according to Embodiment 6 of the present disclosure.

In this embodiment, the interface-ID option field is extended as follows. Adding a layer-3 interface ID field before or after the interface-ID field. The interface-ID field and the layer-3 interface ID field may be distinguished by specifying the layer-3 interface ID field as a fixed length, for example, specifying that the layer-3 interface ID field fixedly occupies four octets, or it may be specified that the interface-ID field and the layer-3 interface ID field are separated by a specific separator, for example, it is specified that the interface-ID field and the layer-3 interface ID field are separated by 0×00. For example, in the case that the VLAN is configured with a layer-3 interface, a layer-3 interface ID field fixedly occupying four octets may be added after the interface-ID field to carry the VLAN ID or the IP address of the VLAN interface (that is, a layer-3 interface connecting the lower-level device), and the specific structure of the layer-3 interface ID field is shown in FIG. 6C.

Step 62: The server receives the relay-forward message, extends the interface-ID option field of a relay-reply message, encapsulates a downstream DHCPv6 message into the relay-message option field of the relay-reply message, copies the peer-address field, the link-address field, and the interface-ID option field of the relay-forward message to the response relay-reply message, and sends the relay-reply message to the DHCPv6 layer-3 relay agent.

The interface-ID option field of the relay-reply message has the same extension structure as the interface-ID option field in the relay-forward message. As shown in FIG. 6C, the ID of the layer-3 interface for connecting the DHCPv6 layer-3 relay agent to the lower-level device is filled in the layer-3 interface ID field.

Step 63: The DHCPv6 layer-3 relay agent extracts the downstream DHCPv6 message from the relay-message option field of the relay-reply message, extracts the ID of the layer-3 interface for connecting the DHCPv6 layer-3 relay agent to the lower-level device, from the interface-ID option field of the relay-reply message, and sends the downstream DHCPv6 message to the lower-level device through the layer-3 interface located by the ID of the layer-3 interface, where the downstream DHCPv6 message is finally forwarded to a client.

According to the message processing method of this embodiment, an interface-ID option field is extended such that the interface-ID option field carries both an ID of a port specified by a protocol and an ID of a layer-3 interface connecting a lower-level device, thereby solving the problems in the prior art.

In addition, in the above embodiment, the server may further construct a relay-forward message and a relay-reply message that include a layer-2 ID field, where the layer-2 ID field carries the ID of the user port (that is, a user port corresponding to the layer-3 interface) specified by the protocol, and the interface-ID option field originally carrying the ID of the user port carries the ID of the layer-3 interface. For example, the server adds a layer-2 ID field to the relay-forward message and the relay-reply message, and then adds the ID of the user port specified by the protocol to the added layer-2 ID field, and adds the ID of the layer-3 interface for connecting the DHCPv6 layer-3 relay agent to the lower-level device, to the interface-ID option field that is originally filled with the ID of the user port. After receiving the relay-forward message, the server correspondingly constructs a relay-reply message including the layer-2 ID field. The ID of the user port corresponding to the layer-3 interface is added to the layer-2 ID field of the relay-reply message, and the ID of the layer-3 interface is added to the interface-ID option field of the relay-reply message. The specific implementation of carrying the ID of the layer-3 interface by the interface-ID option field is similar to that of Embodiment 7. The specific implementation process is not described herein. For details, reference may be made to the description in Embodiment 7. This embodiment may also solve the problems in the prior art.

Figure 7A:
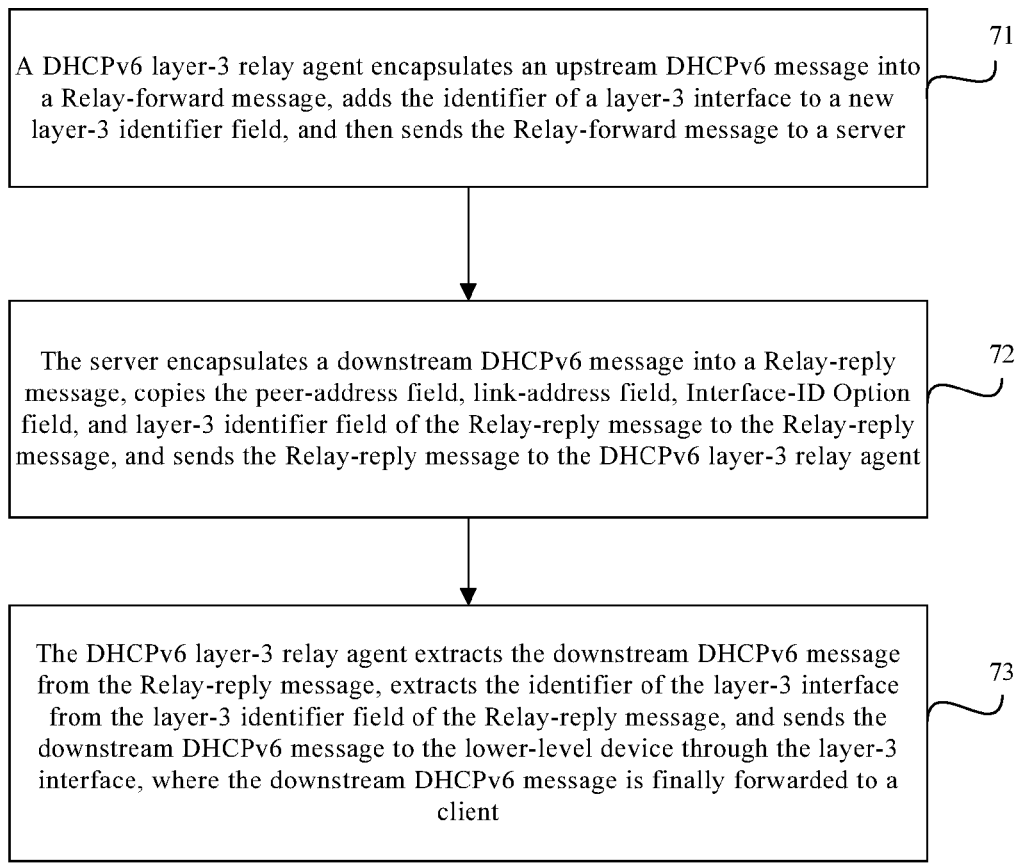
FIG. 7A is a flowchart of a message processing method according to Embodiment 7 of the present disclosure.

FIG. 7A is a flowchart of a message processing method according to Embodiment 7 of the present disclosure. This embodiment may be implemented based on Embodiment 1 to Embodiment 3. As shown in FIG. 7A, the method of this embodiment includes the following steps.

Step 71: A DHCPv6 layer-3 relay agent adds a layer-3 ID field to a relay-forward message, encapsulates an upstream DHCPv6 message into the relay-message option field of the relay-forward message, and fills in the peer-address field, the link-address field, and the interface-ID option field of the relay-forward message. In addition, the DHCPv6 layer-3 relay agent adds the ID of a layer-3 interface for connecting the DHCPv6 layer-3 relay agent to a lower-level device, to the new layer-3 ID field, and then sends the relay-forward message to a server.

Figure 7B:
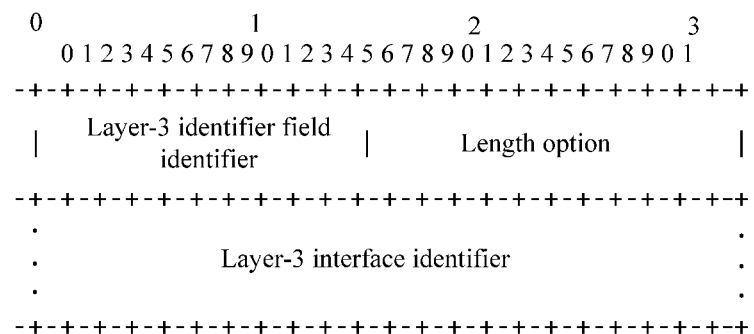
FIG. 7B is a schematic structural diagram of a layer-3 ID field according to Embodiment 7 of the present disclosure.

FIG. 7B is a schematic structural diagram of a layer-3 ID field according to this embodiment, further including a layer-3 ID field ID (OPTION_L3 INTERFACE_ID), a length option (option-len), and a layer-3 interface ID field, where the layer-3 interface ID field is used to carry the ID of the layer-3 interface connecting the lower-level device.

Step 72: The server receives the relay-forward message, adds a layer-3 ID field to a relay-reply message, encapsulates a downstream DHCPv6 message into the relay-message option field of the relay-reply message, separately copies the peer-address field, the link-address field, the interface-ID option field, and the layer-3 ID field of the relay-forward message to the response relay-reply message, and sends the relay-reply message to the DHCPv6 layer-3 relay agent.

For example, according to the relay-forward message, the server constructs a relay-reply message including the layer-3 ID field, adds the ID of the layer-3 interface in the layer-3 ID field in the relay-forward message to the layer-3 ID field of the relay-reply message, and then sends the relay-reply message to the DHCPv6 layer-3 relay agent. The structure of the layer-3 ID field in the relay-reply message is similar to that of the relay-forward message. Reference may be made to FIG. 7B.

Step 73: The DHCPv6 layer-3 relay agent extracts the downstream DHCPv6 message from the relay-message option field of the relay-reply message, extracts the ID of the layer-3 interface for connecting the DHCPv6 layer-3 relay agent to the lower-level device, from the layer-3 ID field of the relay-reply message, and sends the downstream DHCPv6 message to the lower-level device through the layer-3 interface located by the ID of the layer-3 interface, where the downstream DHCPv6 message is finally forwarded to a client.

According to the message processing method of this embodiment, a layer-3 ID field is added to a relay-forward message and a relay-reply message, and the new layer-3 ID field carries an ID of a layer-3 interface, thereby solving the problems in the prior art.

In the above embodiments, various methods are used to carry an ID of a layer-3 interface for connecting a DHCPv6 layer-3 relay agent to a lower-level device (that is, an ID of a layer-3 interface receiving an upstream DHCPv6 message and forwarding a downstream DHCPv6 message) such that the DHCPv6 layer-3 relay agent may find a correct layer-3 interface and complete forwarding of the message, thereby solving the problems in the prior art.

Figure 8:
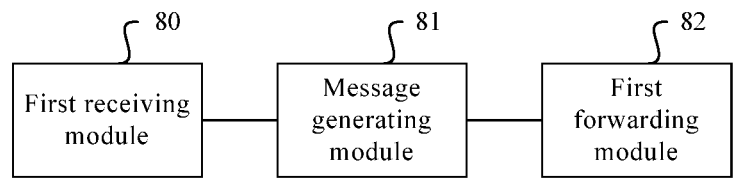
FIG. 8 is a schematic structural diagram of a relay agent device according to Embodiment 8 of the present disclosure.

FIG. 8 is a schematic structural diagram of a relay agent device according to Embodiment 8 of the present disclosure. The relay agent device of this embodiment mainly refers to a DHCPv6 layer-3 relay agent, as shown in FIG. 8, including a first receiving module 80, a message generating module 81, and a first forwarding module 82.

The first receiving module 80 is configured to receive a first DHCPv6 message from a DHCPv6 client and provide the first DHCPv6 message to the message generating module 81. The message generating module 81 is configured to generate a relay-forward message, where the first DHCPv6 message is encapsulated into the relay-forward message and an ID of a layer-3 interface receiving the first DHCPv6 message is added therein, and the layer-3 interface is a layer-3 interface for connecting the relay agent device of this embodiment to a lower-level device. The first forwarding module 82 is connected to a server and the message generating module 81 and configured to send the relay-forward message to the server.

The functional modules of the relay agent device in this embodiment may be configured to execute the procedure in which the DHCPv6 layer-3 relay agent forwards the DHCPv6 message sent by the client to the server. The working principles of the functional modules are not further described in detail. For details, reference may be made to the description in the method embodiments.

The relay agent device of this embodiment carries an ID of a layer-3 interface in the relay-forward message such that a server generates, according to the relay-forward message, a relay-reply message including the ID of the layer-3 interface, and therefore the relay agent device can forward the message according to the ID of a correct layer-3 interface, thereby solving the problems in the prior art, for example, saving resources of global unicast addresses or site-local addresses, reducing the number of layer-3 interfaces, and ensuring the forwarding performance of the relay agent device.

Figure 9:
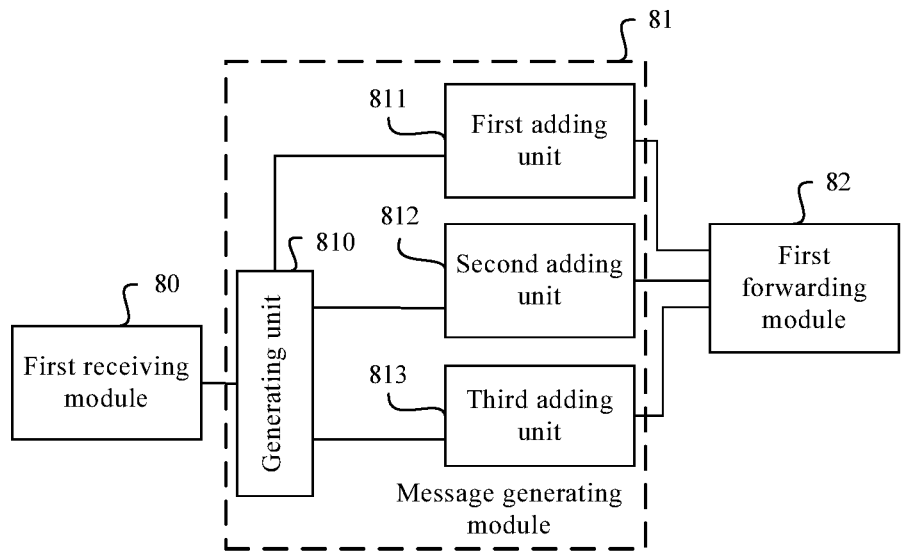
FIG. 9 is another schematic structural diagram of the relay agent device according to Embodiment 8 of the present disclosure.

Further, as shown in FIG. 9, the message generating module 81 of this embodiment includes a generating unit 810 and any one of the following adding units: a first adding unit 811, a second adding unit 812, and a third adding unit 813. The generating unit 810 is configured to encapsulate a DHCPv6 message into a relay-message option field of a relay-forward message. The first adding unit 811 is configured to add an ID of a layer-3 interface to a peer-address field of the relay-forward message. The second adding unit 812 is configured to add the ID of the layer-3 interface to an interface-ID option field of the relay-forward message, and the third adding unit 813 is configured to add the ID of the layer-3 interface to a new layer-3 ID field of the relay-forward message.

The first adding unit 811 is further configured to insert the ID of the layer-3 interface between bit 10 and bit 63 of the peer-address field of the relay-forward message.

The second adding unit 812 is further configured to extend the interface-ID option field of the relay-forward message, and add the ID of the layer-3 interface to the extended interface-ID option field, or further configured to add a layer-2 ID field to the relay-forward message, add an ID of a user port corresponding to the layer-3 interface to the layer-2 ID field, and add the ID of the layer-3 interface to the interface-ID option field of the relay-forward message.

The third adding unit 813 is further configured to add a layer-3 ID field to optional fields of the relay-forward message, and add the ID of the layer-3 interface to the layer-3 ID field.

When the relay-forward message includes an internal-layer relay-forward message and an external-layer relay-forward message (that is, when the relay agent device performs double encapsulation for the first DHCPv6 message sent by the client to the server), the generating unit 810 is further configured to encapsulate the first DHCPv6 message into the relay-message option field of the internal-layer relay-forward message. The second adding unit 812 is further configured to add the ID of the layer-3 interface to the interface-ID option field of the internal-layer relay-forward message, and then encapsulate the internal-layer relay-forward message into the external-layer relay-forward message, or further configured to encapsulate the internal-layer relay-forward message into the external-layer relay-forward message, and add the ID of the layer-3 interface to the interface-ID option field of the external-layer relay-forward message.

The functional units of this embodiment may execute the corresponding procedure in which the DHCPv6 layer-3 relay agent forwards the message sent by the client to the server. The working principles of the functional units are not further described in detail. For details, reference may be made to the description in the method embodiments.

The relay agent device of this embodiment adds, using various methods, an ID of a layer-3 interface connecting a lower-level device, to a relay-forward message such that a server generates a relay-reply message including the ID of the layer-3 interface, and therefore the relay agent device can find a correct layer-3 interface according to the ID of the layer-3 interface and correctly forward the message, thereby solving the problems in the prior art, saving resources of global unicast addresses or site-local addresses, reducing the number of layer-3 interfaces, and improving the forwarding performance.

Figure 10:
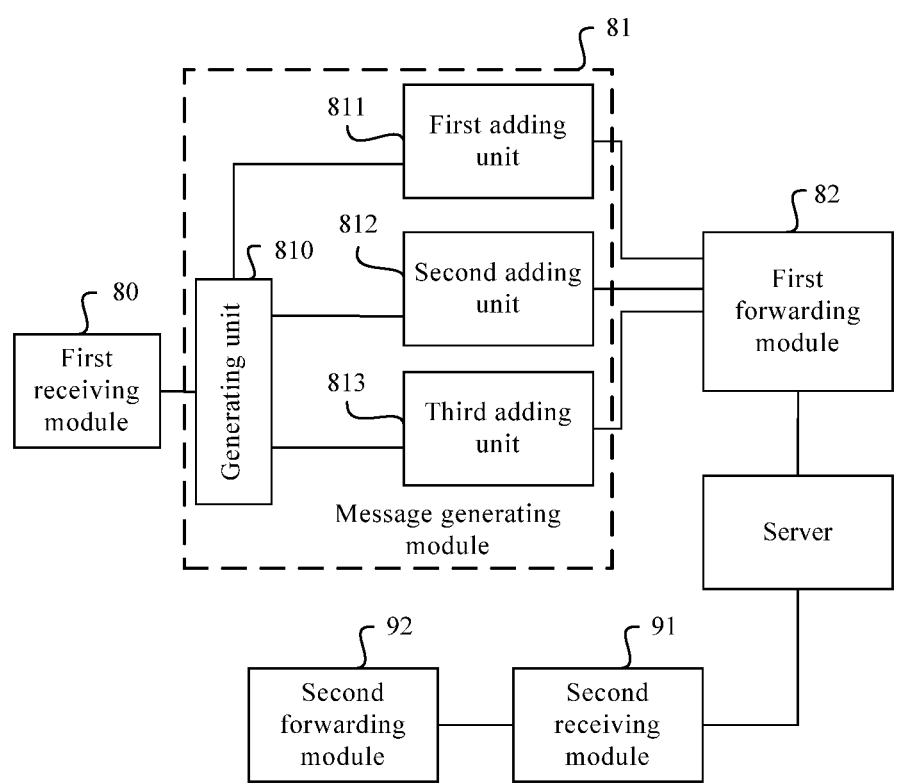
FIG. 10 is another schematic structural diagram of the relay agent device according to Embodiment 8 of the present disclosure.

Further, as shown in FIG. 10, the relay agent device of this embodiment includes a second receiving module 91 and a second forwarding module 92.

The second receiving module 91, connected to the server, is configured to receive a relay-reply message from the server, where the relay-reply message is generated by the server according to the received relay-forward message, where a second DHCPv6 message sent by the server to the client and the ID of the layer-3 interface carried in the relay-forward message are encapsulated into the relay-reply message, where the layer-3 interface is a layer-3 interface on which the relay agent device forwards the second DHCPv6 message in this embodiment, that is, a layer-3 interface on which the relay agent device receives the first DHCPv6 message sent by the client to the server. The second forwarding module 92, connected to the second receiving module 91, is configured to forward the second DHCPv6 message to the client according to the ID of the layer-3 interface in the relay-reply message. For example, the relay agent device forwards the second DHCPv6 message to the lower-level device through the layer-3 interface located by the ID of the layer-3 interface, and then the second DHCPv6 message is forwarded to the client through the lower-level device.

The functional modules of the relay agent device in this embodiment may be configured to execute the procedure in which the DHCPv6 layer-3 relay agent forwards the DHCPv6 message sent by the server to the client. The working principles of the functional modules are not further described in detail. For details, reference may be made to the description in the method embodiments.

The relay agent device of this embodiment adds, using various methods, an ID of a layer-3 interface connecting a lower-level device, to a relay-forward message such that a server generates a relay-reply message including the ID of the layer-3 interface, and then finds, according to the ID of the layer-3 interface, a correct layer-3 interface forwarding the second DHCPv6 message, and successfully forwards the second DHCPv6 message to a client, thereby solving the problems in the prior art, saving global unicast addresses or site-local addresses, reducing the number of layer-3 interfaces, and improving the forwarding performance.

Figure 11:
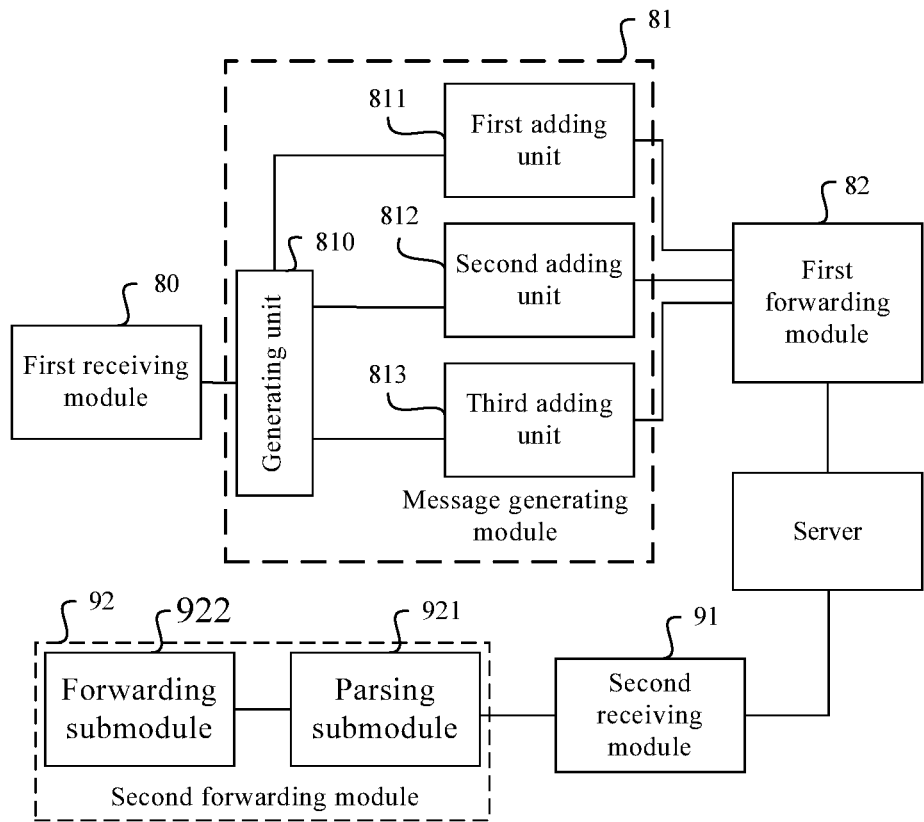
FIG. 11 is still another schematic structural diagram of the relay agent device according to Embodiment 9 of the present disclosure.

Further, as shown in FIG. 11, the second forwarding module 92 of this embodiment includes a parsing submodule 921 and a forwarding submodule 922. The parsing submodule 921, connected to the second receiving module 91, is configured to parse the relay-reply message to acquire the ID of the layer-3 interface and the second DHCPv6 message, and the forwarding submodule 922, connected to the parsing submodule 921, is configured to forward the second DHCPv6 message to the client through the layer-3 interface located by the ID of the layer-3 interface.

Further, the parsing submodule 921 includes any one of the following parsing units: a first parsing unit, a second parsing unit, or a third parsing unit. The first parsing unit is configured to acquire the ID of the layer-3 interface from the peer-address field of the relay-reply message. The second parsing unit is configured to acquire the ID of the layer-3 interface from the interface-ID option field of the relay-reply message, and the third parsing unit is configured to acquire the ID of the layer-3 interface from the new layer-3 ID field in the relay-reply message.

The first parsing unit is further configured to acquire the ID of the layer-3 interface between bit 10 and bit 63 of the peer-address field of the relay-reply message.

The second parsing unit is further configured to acquire the ID of the layer-3 interface from the extended interface-ID option field of the relay-reply message, or further configured to acquire the ID of the layer-3 interface from the interface-ID option field of the relay-reply message including the new layer-2 ID field, where an ID of a user port corresponding to the layer-3 interface is added to the new layer-2 ID field. Alternatively, when the relay-reply message includes an internal-layer relay-reply message and an external-layer relay-reply message, the second parsing unit is further configured to acquire the ID of the layer-3 interface from the interface-ID option field in the relay-reply message, or further configured to acquire the internal-layer relay-reply message from the external-layer relay-reply message, and acquire the ID of the layer-3 interface from the interface-ID option field of the internal-layer relay-reply message.

The relay agent device of this embodiment acquires, using various parsing methods, an ID of a layer-3 interface, and further finds a correct layer-3 interface according to the ID of the layer-3 interface to correctly forward a message, thereby solving the problems in the prior art, saving global unicast addresses or site-local addresses, reducing the number of layer-3 interfaces, and improving the forwarding performance.

Figure 12:
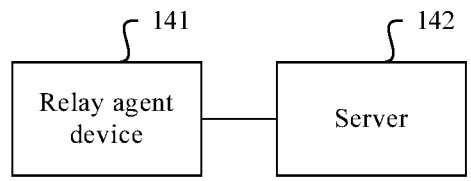
FIG. 12 is a schematic structural diagram of a message forwarding system according to Embodiment 9 of the present disclosure.

FIG. 12 is a schematic structural diagram of a message forwarding system according to Embodiment 9 of the present disclosure. As shown in FIG. 12, the system of this embodiment includes a relay agent device 141 and a server 142. The server 142 refers to a DHCPv6 server.

The relay agent device 141 is configured to construct a relay-forward message after receiving a first DHCPv6 message from a DHCPv6 client, where the first DHCPv6 message is encapsulated into the relay-forward message and an ID of a layer-3 interface receiving the first DHCPv6 message is added therein, and send the relay-forward message to the server 142.

The server 142 is configured to receive the relay-forward message sent by the relay agent device 141, and generate, according to the relay-forward message, a relay-reply message including the ID of the layer-3 interface.

The server 142 is further configured to construct, according to the relay-forward message, a relay-reply message including a layer-3 ID field, and add the ID of the layer-3 interface to the layer-3 ID field of the relay-reply message.

The server 142 is further configured to construct, according to the relay-forward message, a relay-reply message including a layer-2 ID field, add an ID of a user port corresponding to the layer-3 interface to the layer-2 ID field of the relay-reply message, and add the ID of the layer-3 interface to the interface-ID option field of the relay-reply message.

The implementation of constructing a relay-reply message by the server 142 is mainly determined according to the structure of the relay-forward message, and is not limited to the above methods.

Further, the server 142 is further configured to send the relay-reply message to the relay agent device 141. The relay agent device 141 is further configured to receive the relay-reply message sent by the server 142, and forward a second DHCPv6 message in the relay-reply message to the client according to the ID of the layer-3 interface in the relay-reply message.

For the specific working principle and structure of the relay agent device 141 of this embodiment, reference may be made to the embodiments shown in FIG. 8 to FIG. 11. For the working principle of the server 142 reference may be made to the description in the method embodiments shown in FIG. 3 to FIG. 7. Details are omitted herein.

According to the message forwarding system of this embodiment, a relay-forward message and a relay-reply message carry an ID of a layer-3 interface for connecting a relay agent device to a lower-level device such that the relay agent device may find a correct layer-3 interface according to the ID of the layer-3 interface and successfully send the message sent by a server to a client, to the client, thereby solving the problems in the prior art, saving global unicast addresses or site-local addresses, reducing the number of layer-3 interfaces of the relay agent device, and improving the forwarding performance of the relay agent device.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a read-only memory (ROM), a random-access memory (RAM), a magnetic disk or an optical disk.

Finally, it should be noted that the foregoing embodiments are merely intended for describing the solutions of the present disclosure other than limiting the present disclosure. Although the present disclosure is described in detail with reference to the foregoing embodiments, a person of ordinary skill in the art should understand that they may still make modifications to the solutions described in the foregoing embodiments, or make equivalent replacements to some features thereof, without departing from scope of the solutions of the embodiments of the present disclosure.

What is claimed is:

1. A method for forwarding message, comprising:
    receiving, by a relay agent device, a first dynamic host configuration protocol (DHCP) for Internet Protocol (IP) version 6 (DHCPv6) packet from a user device through an interface on the relay agent device;
    generating, by the relay agent device, a relay-forward message comprising a relay-message option, a first interface-identifier (ID) option and a second interface-ID option, wherein both the first interface-ID option and the second interface-ID option are in compliance to option 18 defined in request for comments (RFC) 3315, wherein the relay-message option encapsulates the first DHCPv6 packet, wherein the first interface-ID option indicates an ID of a port on the relay agent device on which the first DHCPv6 packet is received, and wherein the second interface-ID option indicates an ID of the interface on which the first DHCPv6 packet is received; and
    sending, by the relay agent device, the relay-forward message to a DHCPv6 server.

2. The method according to claim 1, further comprising:
    receiving, by the relay agent device, a relay-reply message from network side, wherein the relay-reply message encapsulates a second DHCPv6 packet and the ID of the interface; and
    forwarding, by the relay agent device, the second DHCPv6 packet to the user device according to the ID of the interface.

3. The method according to claim 1, wherein the relay agent device comprises an access node.

4. A relay agent device, comprising:
    a non-transitory computer-readable storage medium; and
    a processor coupled to the non-transitory computer-readable storage medium and configured to execute instructions stored in the non-transitory computer-readable storage medium to perform the following functions:
    receive a dynamic host configuration protocol (DHCP) for Internet Protocol (IP) version 6 (DHCPv6) packet from a user device;
    generate a relay-forward message comprising a first interface-identifier (ID) option and a second interface-ID option, wherein the first interface-ID option and the second interface-ID option are option 18 defined in request for comments (RFC) 3315, wherein the first interface-ID option indicates an ID of a port on the relay agent device on which the first DHCPv6 packet is received, and wherein the second interface-ID option indicates an ID of the interface on which the first DHCPv6 packet is received; and
    send the relay-forward message.

5. The relay agent device according to claim 4, further comprising an access node.

6. A system for forwarding message, comprising:
    a relay agent device; and
    a user device,
    wherein the user device is configured to transmit a dynamic host configuration protocol (DHCP) for Internet Protocol (IP) version 6 (DHCPv6) packet to the relay agent device, wherein the relay agent device is configured to:
    receive the DHCPv6 packet through an interface;
    generate a relay-forward message comprising a relay-message option, a first interface-identifier (ID) option and a second interface-ID option, wherein both the first interface-ID option and the second interface-ID option are option 18 defined in request for comments (RFC) 3315, wherein the relay-message option encapsulates the first DHCPv6 packet, wherein the first interface-ID option indicates an ID of a port on the relay agent device on which the first DHCPv6 packet was received, and wherein the second interface-ID option indicates an ID of the interface on which the first DHCPv6 packet is received; and
    send the relay-forward message.

7. The system according to claim 6, wherein the relay agent device comprises an access node.

8. The system according to claim 6, wherein the user device comprises a DHCPv6 client.

* * * * *